Aug. 1, 1933. R. W. CONN 1,920,630
AUTOMATIC ELECTRODE MOUNTING MACHINE
Filed June 26, 1930 12 Sheets-Sheet 1

Fig. 1.

INVENTOR
R. W. CONN
BY
ATTORNEY

Fig. 8.

Aug. 1, 1933. R. W. CONN 1,920,630
AUTOMATIC ELECTRODE MOUNTING MACHINE
Filed June 26, 1930 12 Sheets-Sheet 7

INVENTOR
R. W. CONN
BY
ATTORNEY

Aug. 1, 1933.          R. W. CONN          1,920,630
AUTOMATIC ELECTRODE MOUNTING MACHINE
Filed June 26, 1930          12 Sheets-Sheet 10

INVENTOR
R. W. CONN
BY
ATTORNEY

Aug. 1, 1933.   R. W. CONN   1,920,630
AUTOMATIC ELECTRODE MOUNTING MACHINE
Filed June 26, 1930   12 Sheets-Sheet 11

INVENTOR
R. W. CONN
BY
ATTORNEY

Aug. 1, 1933.   R. W CONN   1,920,630
AUTOMATIC ELECTRODE MOUNTING MACHINE
Filed June 26, 1930   12 Sheets-Sheet 12

INVENTOR
R. W. CONN
BY M. F. Rees
ATTORNEY

Patented Aug. 1, 1933

1,920,630

UNITED STATES PATENT OFFICE 1,920,630

AUTOMATIC ELECTRODE MOUNTING MACHINE

Robert W. Conn, Edgewood, R. I., assignor to Westinghouse Lamp Company, a Corporation of Pennsylvania Application June 26, 1930. Serial No. 463,856

12 Claims. (Cl. 250—27.5)

This invention relates to a machine for automatically mounting electrodes on a stem and relates more particularly to the mounting of a filament and grid in given relative positions on a stem of electrical devices such as radio tubes or the like.

It is an object of the present invention to provide automatic mechanism wherein a filamentary cathode may be secured in a given relative position on support members of a stem.

Another object of the invention is to provide mechanism for positioning a grid and filament in given space relation and for securing these elements to a supporting structure.

Another object of the invention is to provide mechanism for feeding, shaping and positioning a filament within a grid element.

Another object of the invention is to provide mechanism for automatically mounting a grid and filament in an expeditious and convenient manner.

Other objects and advantages will be evident from the following description together with the accompanying drawings in which.

Electron discharge devices such as radio tubes or the like usually comprise a bulb or envelope having sealed therein what is termed a stem. The stem comprises a glass tubular portion called a flare tube having one end flanged and the opposite end compressed to embed a plurality of support wires therein. An exhaust tube is provided extending from the press, a communicating aperture being formed in the press for exhausting purposes. The lead or support wires which are embedded in the press extend above the press portion and are arranged to receive the several electrodes which constitute the essential internal structure of the device.

In the manufacture of a radio receiving tube, for example, the elements mounted on the support members which extend through the press including a cathode or filament formed from filamentary wire, a grid which is usually comprised of a pair of parallel support members having a helical winding of grid wire therearound and an anode or plate element which may be of tubular form.

As above mentioned the flare tube when consolidated with the exhaust tube and having the support wires embedded in the press thereof is termed a stem and when the severed electrodes are mounted on the support members the structure is termed, a mount. After the elements have been secured in place on the stem the mount is sealed in the bulb by fusing the flanged portion of the flare tube to the neck of the bulb after which the bulb is exhausted by means of the exhaust tube which is then sealed or tipped off and a base is applied to the bulb neck.

The present invention is only concerned, however, with the operation of mounting the electrodes on the stem. Heretofore it was necessary for an operator to manually form the cathode which in certain types of devices is of inverted V-shape and operate welding jaws to secure the ends of the cathode to the provided support members. A grid was then positioned over the cathode and welded to other support members after which the plate or anode was disposed about the grid and secured to members which held it in its space relation to the other elements.

The operation of forming the filament and welding it to the support wires required a considerable amount of skill on the part of the operator and was obviously a slow and tedious operation, which operation was further complicated by reason of the necessity for positioning the grid in accurate relation to the filament and in welding or otherwise securing the grid in place.

The application of the plate to the mount involves a more simple and convenient operation since the plate members are usually made of flattened tubular form with laterally disposed tubular portions adapted to receive elongated support members so that the plate can readily be slid over the support members to its proper space relation with the grid.

The present invention is therefor concerned with the mounting of the filament and grid and comprises mechanism including a plurality of mounting heads movable to position to receive a grid and to mechanism for automatically feeding a filament, severing a given length of the same and forming the filament within the grid, the heads being adapted to receive a stem which is automatically positioned and adjusted to position portions of the filament and grid in operable relation with welding mechanism which automatically secures the grid and filament to the support members.

A machine constructed in accordance with the present invention may therefore comprise a plurality of what may be termed mounting heads movable through a given path and operable to progressively perform the operations of mounting the filament and grid thereby eliminating hand operations, increasing speed of production and reducing cost of manufacture.

A machine for practicing the present invention may comprise a rotary conveyor 25 comprising a disk 26 mounted on a central vertical shaft 27. Means to be hereinafter described are provided whereby the conveyor is moved intermittently. Along the periphery of the disk 26 and disposed in spaced relation are secured a plurality of mounting heads 28.

The present construction shows twelve heads and the conveyor is given twelve intermittent movements to a cycle. Any number of heads may be used, however, and although the selected embodiment of the invention shows a rotary conveyor it is obvious that heads as illustrated may be mounted on conveyors of various forms, as for example, a belt type of conveyor may be employed wherein the heads are moved through a rectilinear path. The heads 28 are of similar construction and perform different operations during the successive rest stages or stations of the conveyor.

As herein-above mentioned the function of a head is first to receive and hold a grid 29. This grid may be of the usual form constructed of a pair of parallelly spaced support wires 31 and 32 (see Fig. 6) and a helically wound grid wire 33.

Figures 10, 11, 12:
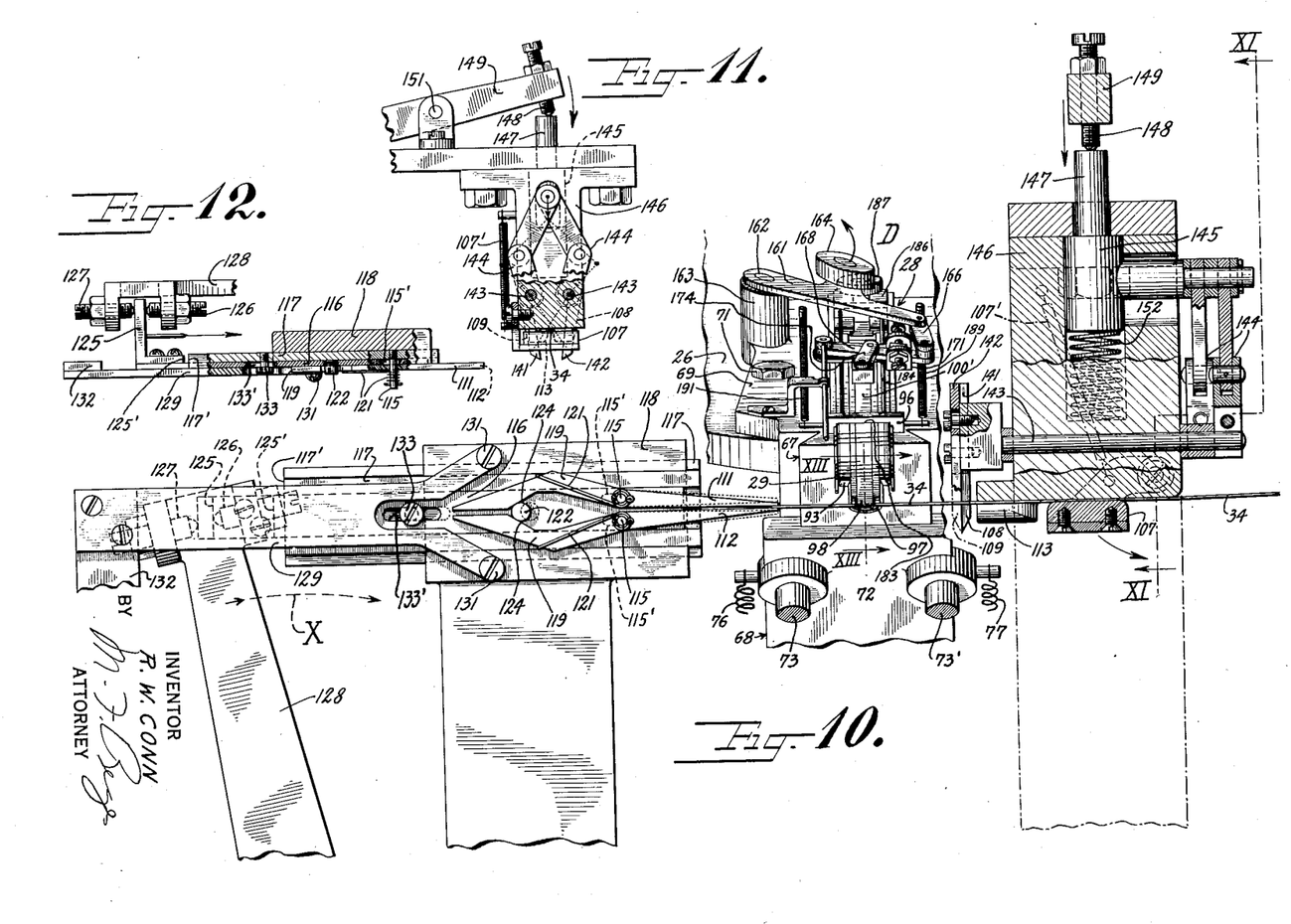
Fig. 10 is a view showing filament feeding mechanism, filament shaping mechanism and cutting mechanism. In this view the mounting head is shown in perspective, the cutters are shown in vertical section and the feeding mechanism is shown in plan. The various parts of the machine in this view have been illustrated out of their actual positions for the sake of clearness.
Fig. 11 is a detail view partly in section taken on line XI—XI in Fig. 10 and showing the filament cutting mechanism.
Fig. 12 is a fragmentary longitudinal section of the filament feeding device as illustrated in Fig. 10 but shown on a smaller scale.

After the grid is positioned the head is operated in conjunction with other machinery for shaping a filament wire 34 to V-shape within the grid 29 (see Fig. 10).

A stem 35 (see Fig. 17) is then positioned in the head. The stem 35 may comprise a flare tube 36 having the usual press 37 and exhaust tube 38. Embedded in the press are a plurality of rigid support wires upon which the filament and grid are secured preferably by welding.

Figures 17, 18:
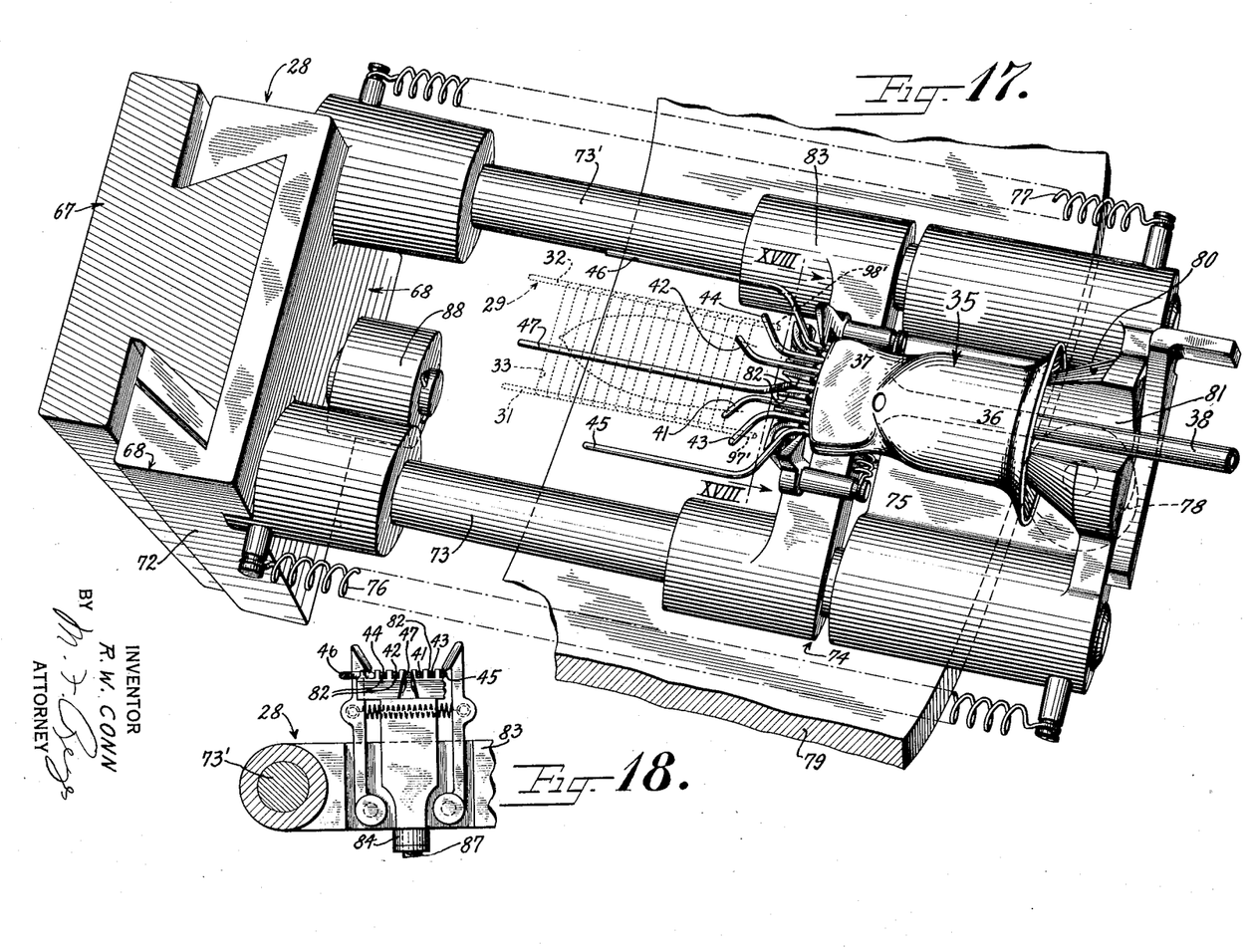
Fig. 17 is a perspective view of a head for holding a stem during a mounting operation.
Fig. 18 is a cross sectional view taken on lines XVIII—XVIII in Fig. 17.

The stem shown includes filament support wires 41 and 42 and grid support wires 43 and 44 also plate or anode support wires 45 and 46 as well as a central filament support wire 47. The present invention is concerned with the filament and grid supports primarily since means are provided for automatically securing the filament and grid to these supports.

The plate supports are, however, provided to secure a flattened tubular plate which is provided with lateral tubular portions to receive the support wires during a subsequent operation after the filament and grid have been mounted. At this time the upper or apex of the filament is also connected with the upper end of the support wire 47 by means of a resilient arm. These operations of mounting the plate and connecting the filament with its upper support may be performed by hand or upon another machine.

Figure 1:
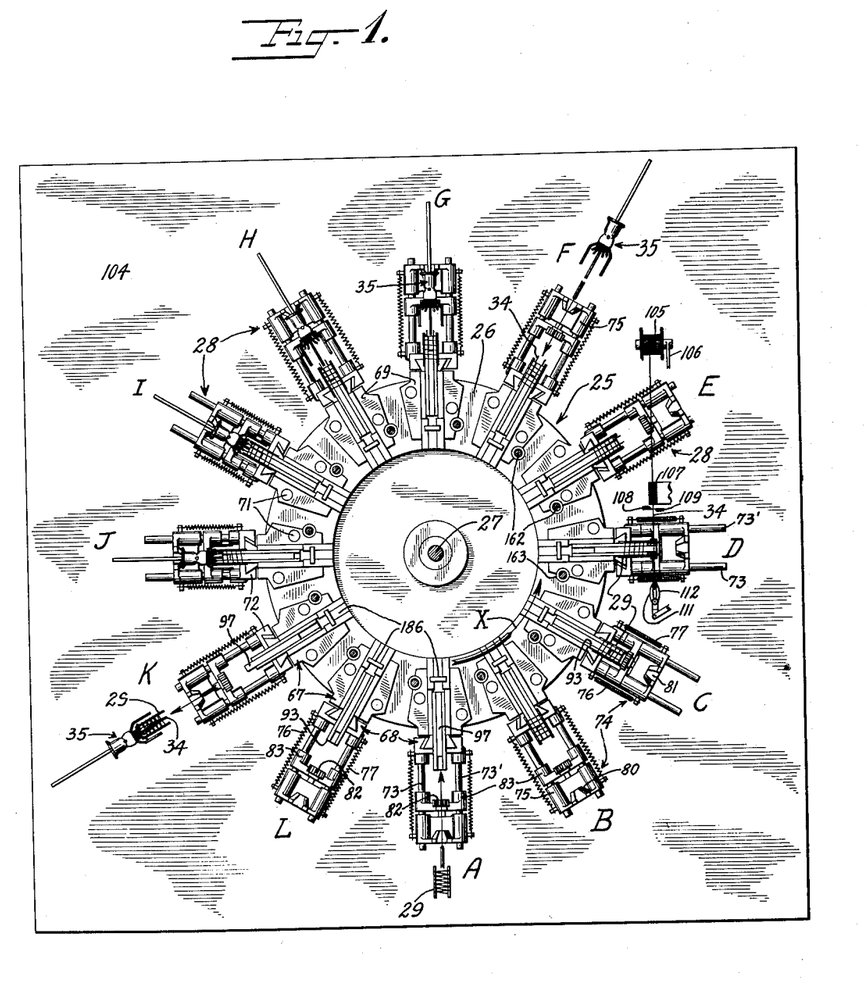
Fig. 1 is a plan view of a machine having a plurality of mounting heads thereon constructed in accordance with the present invention and showing the various steps of operation.

The operations above enumerated are performed progressively during the intermittent movement of the conveyor as follows (see Fig. 1).

Grids may be loaded at stations A, B and C.

The filament wire 34 is cut to length, shaped and held in position at station D.

At stations E, F, G and H the stem is loaded and automatically adjusted to bring the support wires in proper relation to the ends of the filament and grid support wires.

At station I the ends of the filament wires are welded to their respective support wires.

At station J the ends of the grid support wires are welded to their respective support wires, and the stem with the grid and filament mounted thereon is unloaded at stations K and L.

The loading stations A to C make it possible for an operator to load several heads during a rest stage of the conveyor and the unloading stations K and L give a time element for unloading. The stations F to H are provided to allow for the adjustment of the stem with relation to the filament and grid.

The foregoing gives a general description of the operation and result of the present machine. The following detailed description will describe the specific construction and operation with reference to the various mechanical elements and their relation and cooperation in the performance of the mounting of the filament and grid.

Figure 25:
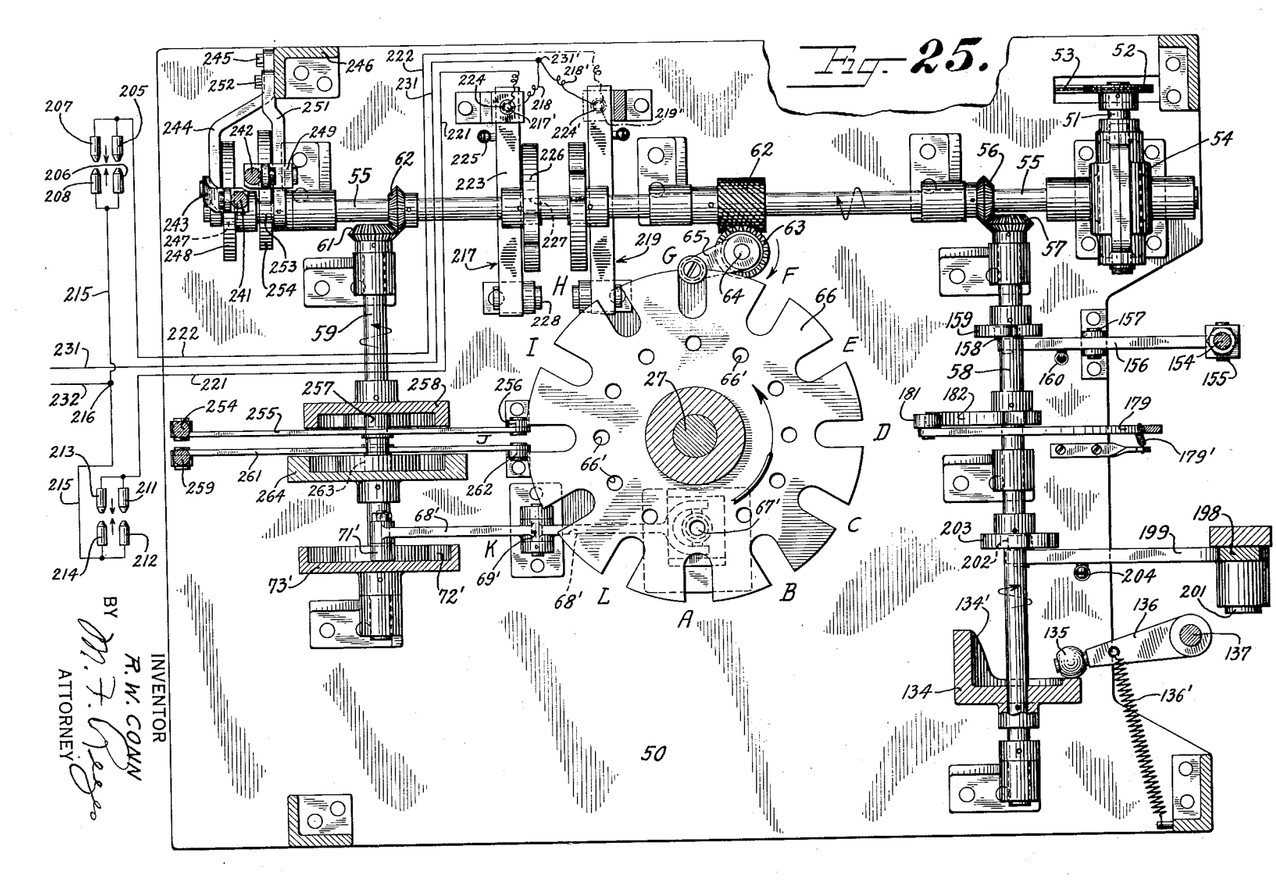
Fig. 25 is a plan view partly in section of the operating mechanism below a supporting table and shows the driving means for the various mechanism for operating the heads and welding devices at the various stages throughout their movement for the mounting of the filament and grid.

Mechanism for rotating the conveyor and for actuating the heads for their various operations at the various stations may as shown in Fig. 25 comprise a main driving shaft 51 journaled in suitable bearings on a bed plate 50 having a sprocket wheel 52 connected by a chain 53 with a source of power, as for example, a motor (not shown). The shaft 51 is connected by means of a standard reduction gear box 54 with a secondary driving shaft 55. This shaft is provided with a beveled gear 56 in mesh with a beveled gear 57 at one end of what may be termed a primary counter-shaft 58 journaled in suitable bearings on the bed plate. A secondary counter-shaft 59 is also provided, journaled in suitable bearings and having a bevel gear 61 in mesh with a bevel gear 62 on shaft 55. These three shafts serve to translate motion to the heads by means of suitable intermediate machine elements. The shaft 55 is provided with a worm wheel 62 in mesh with a worm 63 on a shaft 64. The shaft 64 has mounted thereon an arm 65 of a Geneva drive the slotted plate 66 of which is mounted on the shaft 27 of the conveyor 25 thus giving the same the desired intermittent movement of twelve rest periods to a cycle. The shaft 27 may be fixed and the conveyor secured to and movable with the plate 66 of the intermittent driving mechanism.

For the purpose of locking the conveyor during each stationary period the underside of the conveyor disk is provided with suitably spaced holes 66' arranged to be engaged by a pin 67' pivotally held at one end of an arm 68' which arm is pivoted at 69' and provided with a roller 71' at its opposite end disposed in a cam groove 72' of a cam 73" secured to counter-shaft 59. The cam 73" is so proportioned that as the conveyor comes to rest after each intermittent movement the pin 67' will engage a hole and when the conveyor is about to again move the cam actuates to remove the pin. By means of the above locking mechanism the mounting heads are held rigid during the performance of the several mounting operations.

Figure 2:
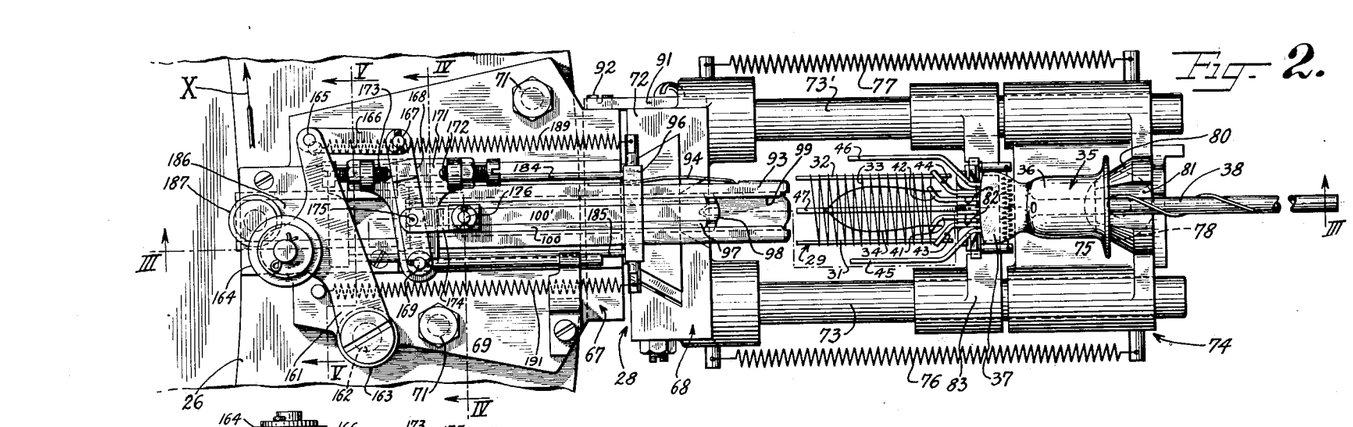
Fig. 2 is a plan view of one of the heads shown as part of the machine in Fig. 1, the head being shown ready for an unloading operation.
Figure 3:
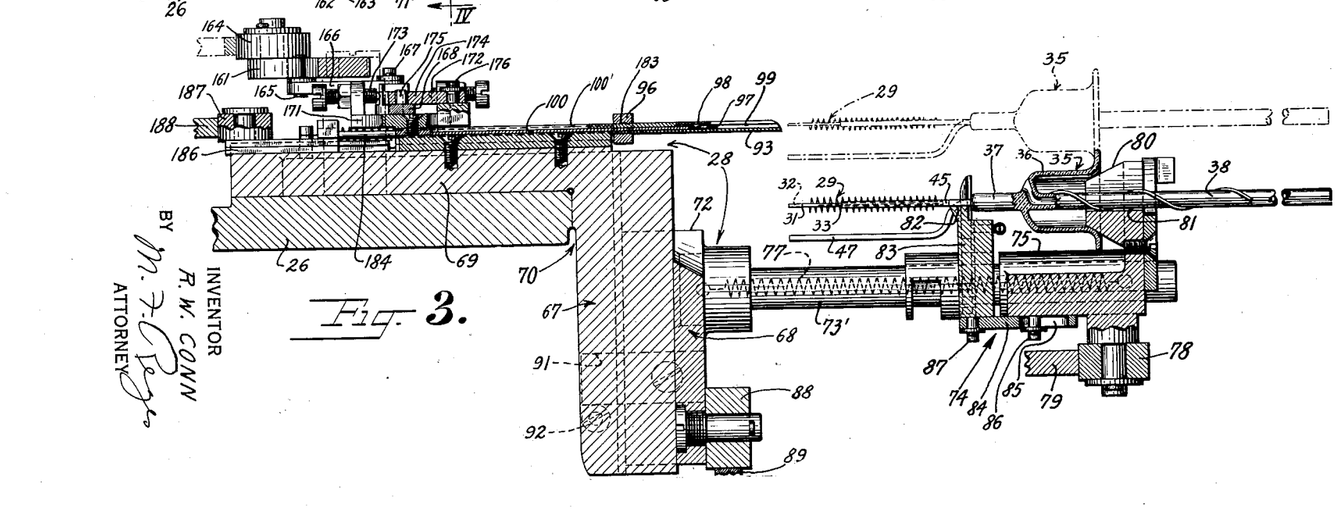
Fig. 3 is a longitudinal section taken on lines III—III in Fig. 2.

Referring now to the heads as shown clearly in Figs. 2 and 3, each head is comprised of a stationary portion 67 and a relatively movable portion 68. The stationary portion includes mechanism for holding the grid and forming the filament and may be termed the mounter element, while the relatively movable portion holds the stem and adjusts it with respect to the formed filament and grid and may be termed the stem carrier or adjuster.

The mounter element may comprise a right angle support 70 preferably a casting having one arm of the angle in the form of a plate 69 secured to the conveyor by tap bolts 71. Depending from the plate is a dove tail guide or gib over which a grooved block 72 forming part of the stem adjuster is movable vertically. The block 72 is provided with horizontally extending rods 73 and 73' to receive a stem carrier 74.

This carrier may include a cross piece 75 slidable on the rods 73 and 73'. Springs 76 and 77 are provided to normally urge the cross piece toward the block 72 and a rocker-arm 78 engageable with a cam member 79 serves to cause an opposite movement of the cross piece. The said cross piece is provided with a conical rest member 80 to enter the flare tube 36 and is formed with a slot 81 to receive and support the exhaust tube 38 of a stem.

The support wires of the stem seat in slots 82 in a supplemental cross piece 83 slidable on rods 73 and 73' and attached to the cross piece 75 by means of a link 84 having a slot 85 through which a pin 86 on the cross piece 75 extends, the link being loosely secured by a pin 87 to the cross piece 83. By reason of the link 84 the cross pieces 75 and 83 act as a unit but relative movement is allowed by reason of the slot 82 and the slot 85 to accommodate for variations in the dimensions of different type stems.

The stem adjuster 74 is slidable vertically on the depending guide or the support 67 and the block 72 is provided with a roller 88 for engagement with a cam 89 to raise the stem support at the proper time. The said stem support will, by reason of its weight, normally take a lower position which is limited by a stop comprising an arm 91 extending from the block 72 for engagement with a stop pin 92 on the support 67. The operation of the stem support by means of the cams 79 and 89 will be presently described.

The mounter element carried on the support 67 comprises a grid receiving member or tongue 93 secured to and extending from the plate 69. This tongue is of such proportion as to fit the interior of a grid which may be slipped thereover and be held by means of a leaf spring 94 disposed in a recess on one edge of the tongue.

Figures 4, 5, 6, 7:
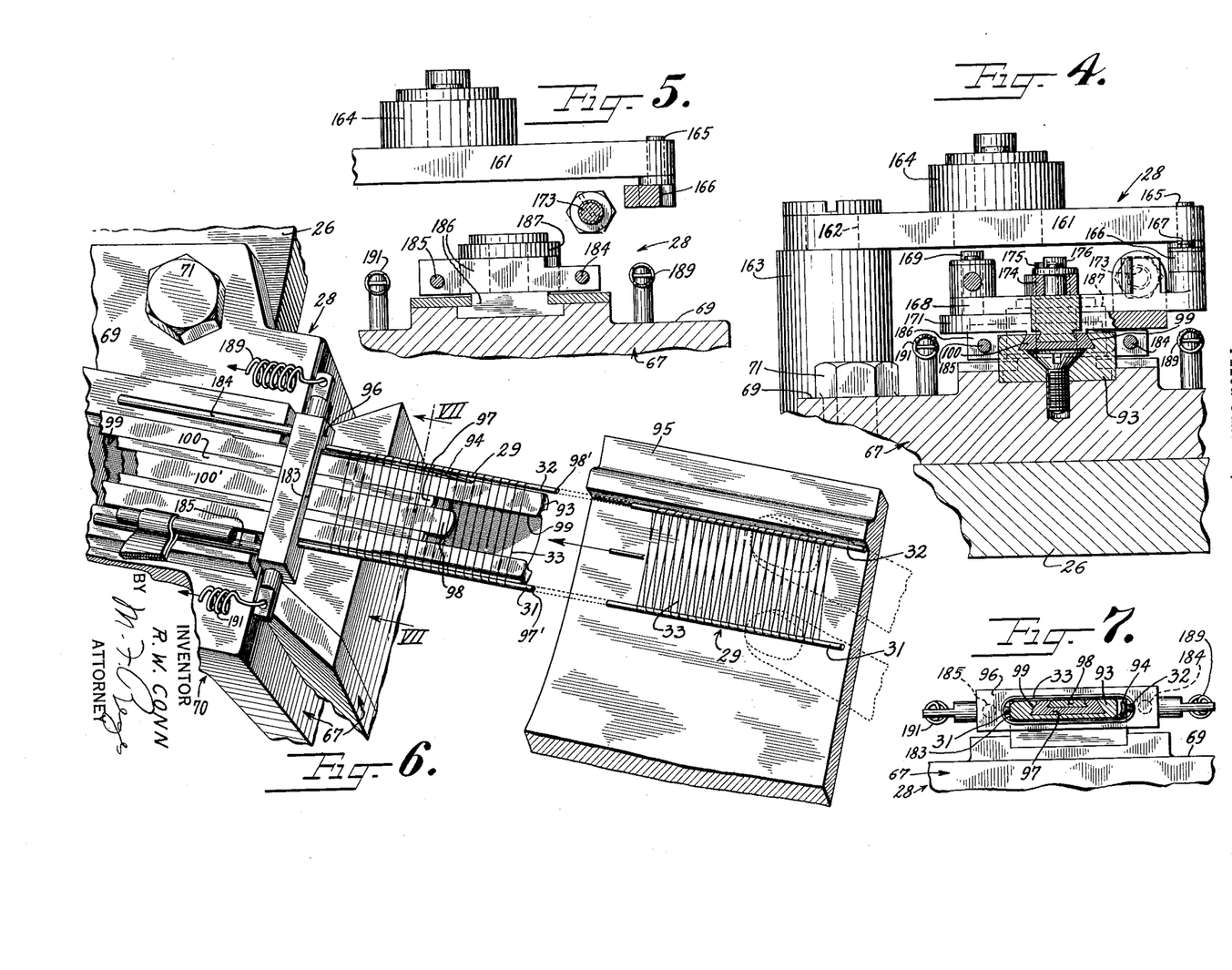
Fig. 4 is an enlarged cross sectional view taken on line IV—IV in Fig. 2.
Fig. 5 is an enlarged cross sectional view taken on lines V—V in Fig. 2.
Fig. 6 is a perspective view showing mechanism for supporting a grid when fed to a head.
Fig. 7 is a cross sectional view taken on lines VII—VII in Fig. 6 and showing a grid in position on the head.

As shown in Fig. 6 a guide plate 95 may be provided adjacent to the grid loading position and a grid may readily be slid from the guide to position onto the tongue until the ends of the support wires of the grid engage a stop-bar 96. When the grid is positioned as above described it may be considered as in its inward position and when in this position its projecting ends are prevented from interfering with the filament forming operation. After the filament is formed the stop 96 is actuated, by means to be later described, to return the grid and position the outer ends 97' and 98' of its support wires 31 and 32 respectively for welding to support wires 43 and 44 respectively.

Figures 13, 14, 15, 16:
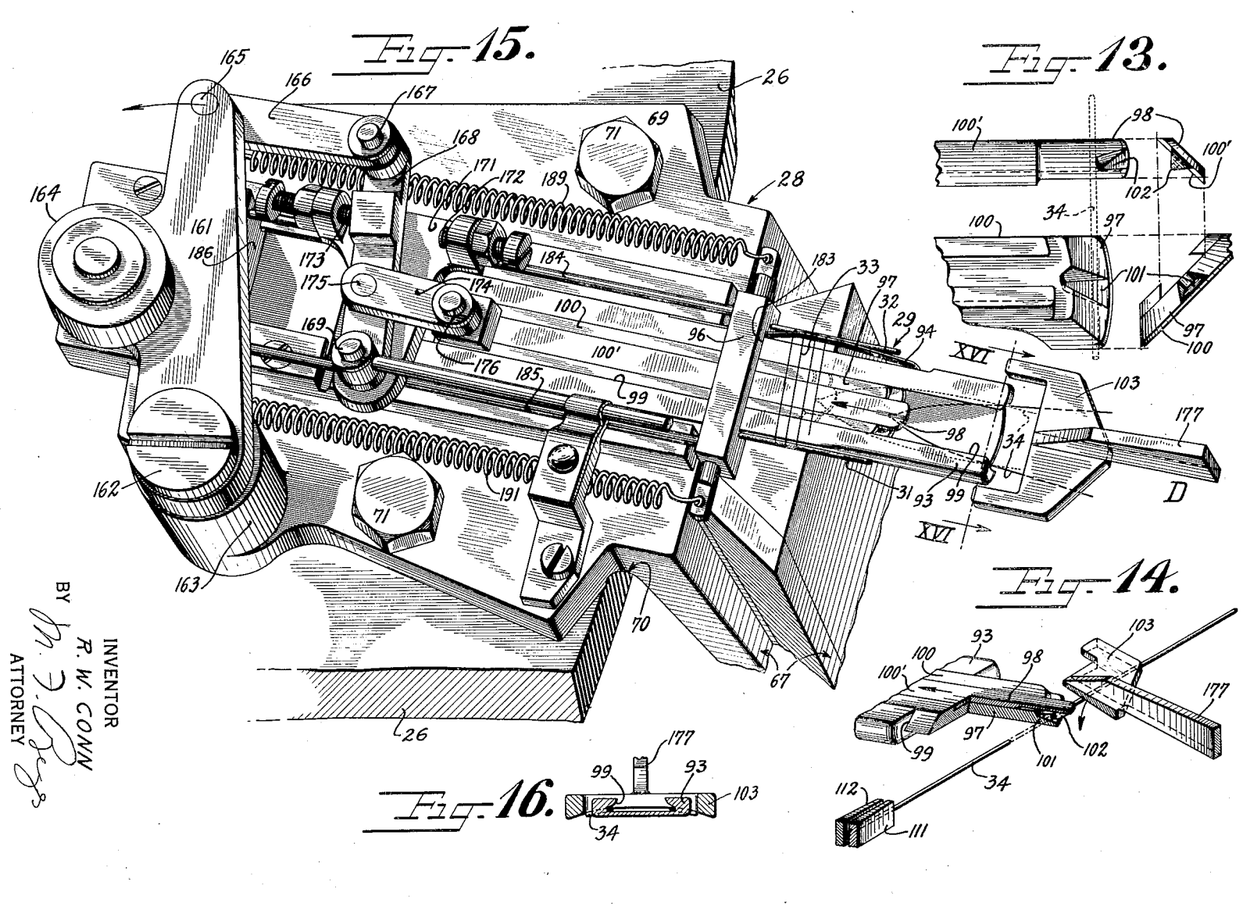
Fig. 13 includes perspective views of the ends of the filament gripper mechanism drawn on an enlarged scale.
Fig. 14 is a perspective view partly in section of the filament gripper mechanism with the various elements in the positions which they take just prior to the operation of gripping the filament, means for holding down the filament ends are also shown.
Fig. 15 is a perspective view of the filament forming device shown in position for forming the filament.
Fig 16 is a cross sectional view taken on lines XVI—XVI in Fig. 15 showing the formation of the filament and means for holding the same to guide the filament during the forming operation.

The filament forming or shaping mechanism includes a pair of gripper jaws 97 and 98. These jaws are disposed at the ends of members 100 and 100' and are slidable with relation to each other and the lower or carrier member 100' is slidable in a slot 99 provided in the tongue 93. The members may be reciprocated as a unit and when in their forward or wire receiving position the jaw of the upper member extends slightly beyond the lower jaw. The end of the lower jaw 97 is, as shown in Figs. 13 and 14 provided with a groove 101 cut into the inclined surface to provide space to receive the filament wire and the upper jaw 98 is provided with a small lug 102.

The exposed or outer face of the lug is inclined so that as the jaws are moved outwardly a filament wire held across their path of movement will pass the lug and become positioned between the lug and the inclined surface of the lower jaw. The jaws may then be retracted which movement causes the upper member to move first and engage the lug 102 with the groove 101 in the inclined surface of the lower jaw thus locking the filament in place and a continued return movement of the jaws will draw a V-shaped portion of filament into the slot 99 of the tongue 93. During the return movement of the jaws a retainer member 103, actuated by means to be presently described, engages the traveling ends of the filament to guide them into the slot 99.

A release of the filament from between the jaws 97 and 98 is accomplished by the relative movement of the jaws upon an advance movement, during which the upper jaw moves first and thus releases the filament which drops from between the jaws.

The foregoing describes the positioning of the grid and the forming of the filament.

Figure 8:
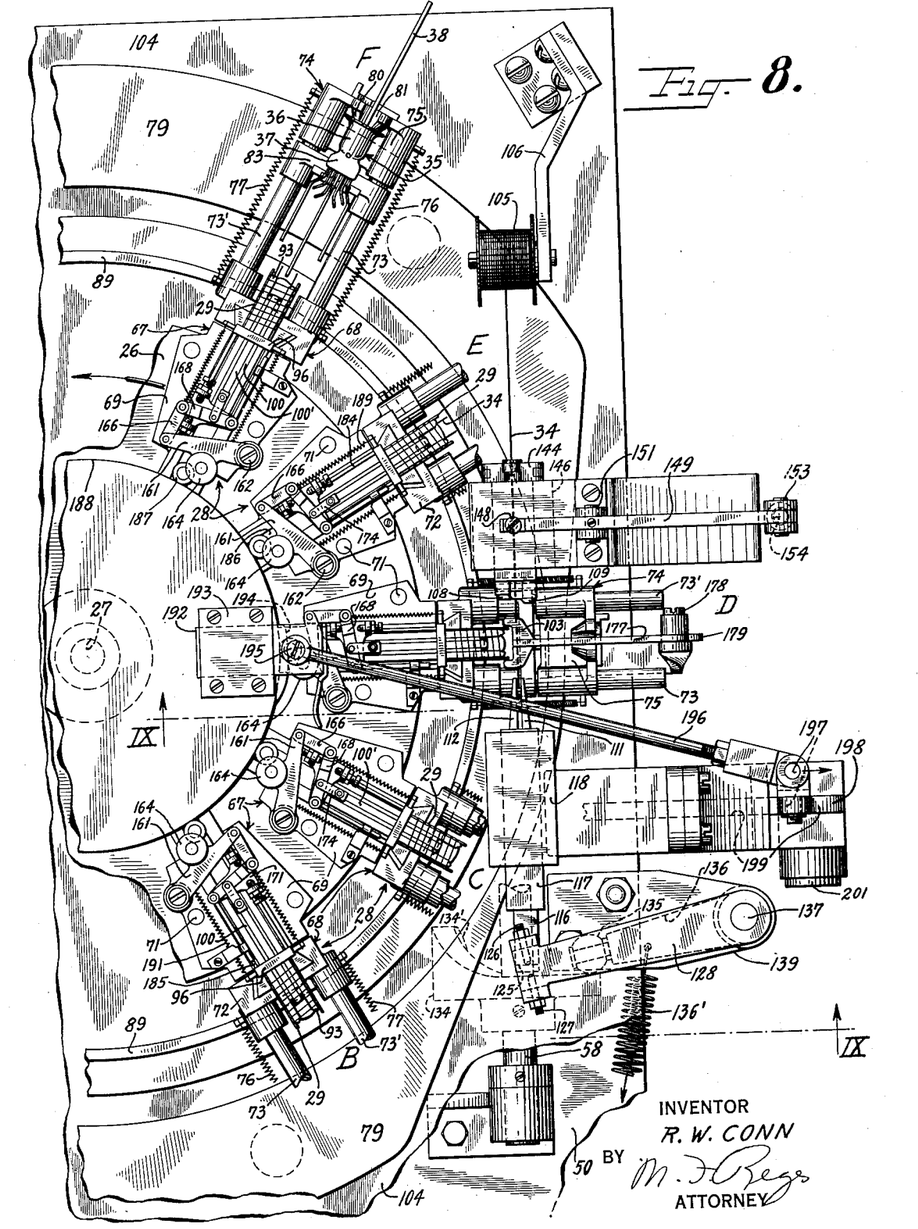
Fig. 8 is a fragmentary plan view of filament feeding, gripping, cutting and holding mechanisms.
Figure 20:
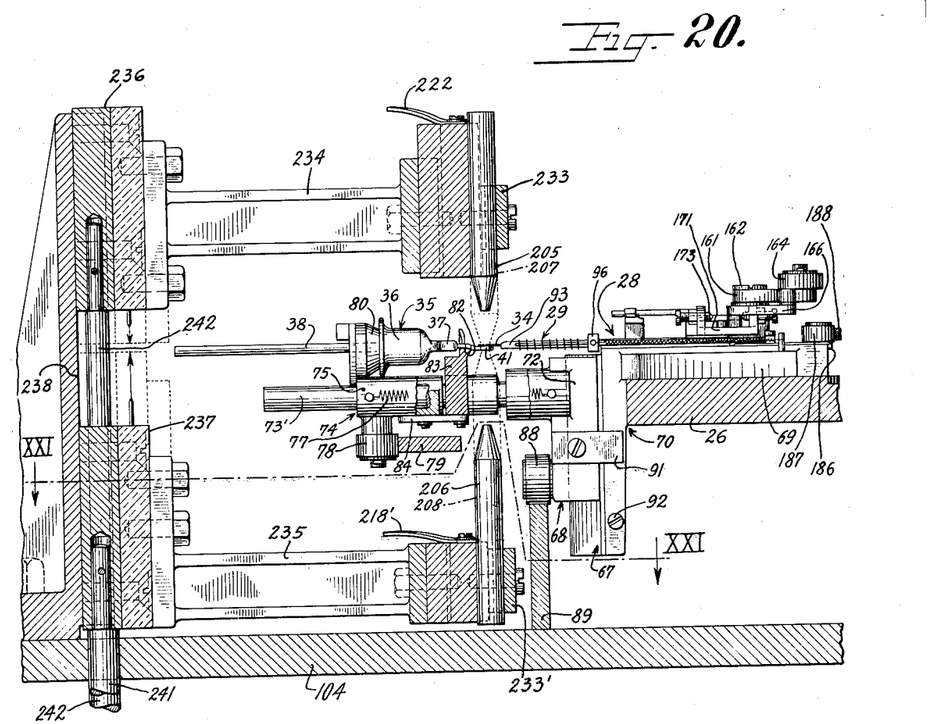
Fig. 20 is an elevational view partly in section of the grid welding mechanism taken on lines XX—XX in Fig. 19 but shown on a larger scale.

Mechanism for actuating the stem holder as above mentioned may include the cams 79 and 89 (see Figs. 8 and 20). These cams may be stationary and mounted on the framework or table 104 of the machine and may be so formed and proportioned that as the conveyor rotates the cam surfaces 79 and 89 will engage the rollers 78 and 88 respectively. The cam 79 is formed with undulations in accordance with the effective surface of the cams 89 so that as the conveyor moves and the cams 89 cause an upward and downward movement of the stem holder the cam 79 will also actuate the crosspieces 75 and 83.

At positions A, B and C the head or stem holder 68 is in its lower position so that a grid 29 may be slid over the tongue 93 and the slide members 100 and 100' having jaws 97 and 98 are in their returned or retracted position.

When the conveyor moves the head to position D the filament wire 34 is drawn across the path of movement of the jaws. The filament wire may be carried on a spool 105 (see Figs. 8, 9 and 10) mounted on a suitable bracket 106 secured to the framework of the machine. The wire 34 is led under a friction pad 107 tensionally held by a spring 107' and between cutters 108 and 109 by means of a pair of tweezer members 111 and 112. When the tweezers have pulled a sufficient length of wire across the path of the forming jaws 97 and 98 the cutters operate to sever the wire after which the cutters open and are ready to permit the tweezer ends to pass and grip the end of the wire supply for the next operation. As shown a positioning guide 113 is provided adjacent to the cutter and the friction pad 107 serves as a support so that the end of the wire supply will rest on the support and project from the guide to provide in a certain position a free end to be gripped by the tweezers.

The tweezers may comprise the above mentioned members 111, and 112 (see Figs. 11 and 12) pivoted at 115. The pivots 115 pass through slots 115' in a slide plate 116 and are fixed in a carrier 117. The slide plate 116 is movable in the carrier 117 which latter is slidable in gibs of a guide 118 mounted on a supporting bracket secured to the stationary structure of the machine. The tweezer jaws are each provided with an arm 119 and spring members 121 engage the arms and normally urge the jaws open.

For the purpose of closing the jaws to grip the wire a pin 122 is provided. This pin is secured to the slide plate 116 and is disposed for engagement with surfaces 124 on the arms 119. The under side of plate 116 is provided with a finger 125 (see Fig. 12) engaged at opposite sides by adjustable contact points 126 and 127 at one end of an arm 128 adapted to rock to move the tweezers as a unit. A tap screw 133 passes through a slot 133' in the plate 116 and is fixed in the carrier 117; thus the plate 116 is held in its guide but permitting a small longitudinal movement of the plate. A cover 129 secured to the block 118 by tap bolts 131 and to a stationary support 132 holds the plate 116 slidable in its guide, when moved by the actuation of the arm 128 in its rear or outermost position as shown in Fig. 10.

An initial movement of the arm moves the plate 116 causing the pin 122 to disengage with the surfaces 124. The initial movement of the arm 128, therefore, permits the jaws of the tweezers to open and a continued movement of the arm brings a face 125' of the finger 125 in contact with a face 117' of the carrier 117 thereby causing a movement of the carrier 117, and a movement of the tweezers with their jaws open to position to grip the end of a filament extending from the guide 113. A return movement of the lever 128 will first cause a movement of the plate 116 bringing the pin 122 in contact with the surfaces 124 of the tweezer arms closing the tweezer jaws to grip the wire which is carried across the path of movement of the filament forming jaws and ready to be severed, at which time means are actuated to operate the cutters 108 and 109.

The jaws of the tweezers are then opened by a slight forward movement of the arm 128 which moves the pin 122 from engagement with surfaces 124. This operation is performed by means of a cam to be later described. The tweezers then remain with their jaws in open positions ready for another forward movement upon a continued actuation of the arm 128.

The arm 128 receives motion from the shaft 58 (see Figs. 9 and 25) which is provided with a cam 134 having a lateral cam surface 134' engaging a cam follower 135 on an arm 136 under tension of a spring 136'. The arm 136 is secured to one end of a vertical shaft 137 supported in suitable guide bearings 138 and 139 having the arm 128 secured to its opposite end so that a rotation of the cam 134 will cause an oscillation of the arm 128 to actuate the wire gripping tweezers and its associated cooperating elements.

After the tweezer mechanism has operated to draw a filament wire across the path of movement of the wire forming jaws the cutters 108 and 109 actuate to sever a predetermined length of wire. These jaws are shown in Figs. 10 and 11 may comprise shearing blades 141 and 142 pivoted at 143 and connected by a toggle 144 with a slide block 145 in a casing 146. The slide block is provided with an extension 147 adapted to engage with a contact pin 148 at one end of a lever arm 149 pivoted at 151.

A movement of the arm 149 causes an actuation of the jaws which are normally held open by a helical spring 152 which serves to urge the slide block 145 outwardly against the actuating lever arm 149.

This lever arm 149 (see Figs. 9 and 25) is pivotally connected at 153 with a link 154 pivotally attached at 155 with one end of a rocker arm 156 pivoted at 157. The opposite end of the arm 156 is provided with a cam follower 158 which traverses the surface of a cam 159 secured to the shaft 58. A spring 160 fastened to the rocker arm 156 keeps the follower in contact with the arms. The cam 159 is so formed that during a revolution thereof the cutter blades 141 and 142 are actuated in the proper time relation with the other elements. As the cutter members operate and the jaws of the tweezers open the filament forming jaws are retracted causing the upper jaw to move and grip the filament between the lug 102 and the tapered groove 101 of the lower jaw 97 (see Figs. 13 to 15).

The mechanism for actuating the filament forming jaws may comprise a rocker arm 161 pivoted at 162 on a post 163 integral with the plate 69. The rocker arm 161 is provided with a roller 164 which is actuated by means of stationary cam members to be presently described. The said arm 161 is pivotally connected at 165 to one end of a link 166, the opposite end of which is pivoted at 167 to an actuating lever 168 pivotally attached at 169 to a carriage 171 slidable on the tongue 93 and attached to the member 100 and its lower jaw 97 of the filament forming jaws. The said lower jaw as hereinbefore mentioned is slidable in the tongue 93. The actuating lever is movable between adjustable stops 172 and 173 secured to the carriage 171 and an intermediate link member 174 having one end pivotally connected at 175 with the actuating lever 168 and the opposite end pivotally connected at 176 with the member 100' and its upper jaw or slide member 98 provides for a relative movement between the jaws and for a movement of the jaws as a unit.

When the lever 161 is in position to retract the jaws, the upper jaw will, by reason of the link 174, be first moved to a given relative position with the lower jaw which position is determined by the stop 173. A continued movement of the lever 161 carries the jaws as a unit to draw the filament into the slot 99 provided in the tongue 93. At this time retainer member 103 takes a position to guide the free ends of the filament wire into the slot. This retainer member (see Fig. 9) is mounted at one end of a bent arm 177 pivoted at 178 and having an extended portion 179 provided with a spring 179' and a cam-follower 181 in contact with a cam 182 secured to the shaft 58 and a rotation of the said cam will move the member 103 to its operative position and remove it after the filament has been shaped or formed. This operation of grid adjustment or positioning for welding is accomplished between the stations I and J; that is after welding of the filament to its supports but previous to welding of the grid (see Fig. 23).

As above pointed out the filament is formed while the grid is in position on the tongue 93, the grid however when initially positioned is advanced inwardly so as to remove its ends from interference during the filament forming and welding operation. The stop-bar 96 is thus provided and after the filament has been formed and the ends thereof welded to the support wires, the stop-bar may be moved to adjust the grid for a welding operation. This stop-bar is provided with an aperture or slot 183 to permit it to slide over the tongue 93 and is mounted on rods 184 and 185 which rods extend from and are secured to a slide member 186 (see Fig. 23) having a roller 187 for engagement with a staionary cam 188.

Figures 22, 23, 24:
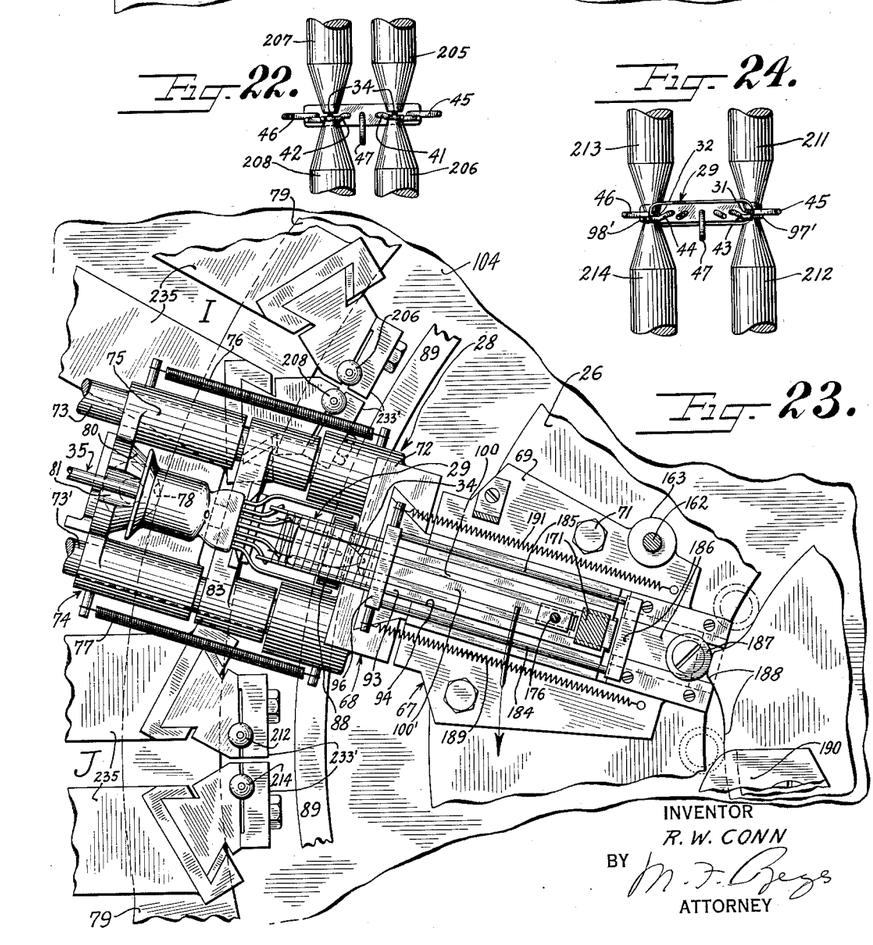
Fig. 22 is a fragmentary elevational view of the filament welding mechanism.
Fig. 23 is a fragmentary plan view partly in section showing means for positioning a grid.
Fig. 24 is a fragmentary elevational view of grid welding mechanism.

Springs 189 and 191 normally hold the stop-bar in a retracted position until a head moves to bring the roller 187 in contact with the stationary cam 188 thus moving the stop-bar forward a predetermined distance and adjusting the grid so that the ends of its supporting wires wil be in a position for the welding operation.

Figure 9:
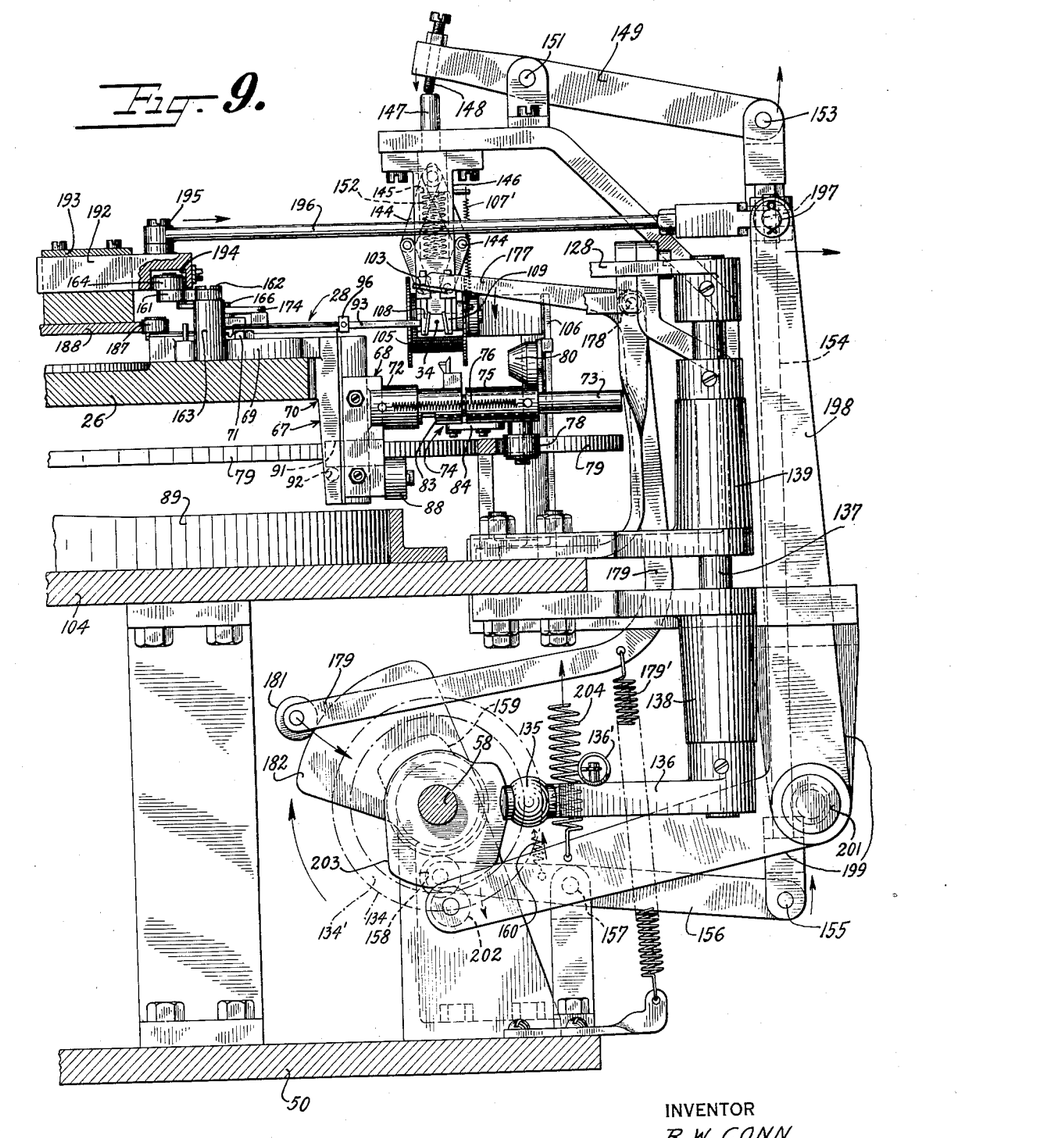
Fig. 9 is a cross sectional view taken on lines IX—IX in Fig. 8 and shows the mechanism illustrated in Fig. 8 in elevation and on a larger scale.

Means for actuating the wire forming jaws 97 and 98 may, as shown in Figs. 8 and 9, comprise a slide member 192 movable in a guide 193, and having a recess 194 to receive the roller 164 on the rocker arm 161. The slide member 192 may be pivotally connected with one end 195 of link rod 196 having its opposite end pivotally connected at 197 with one arm 198 of a bell-crank 199 pivoted at 201 and having a cam follower 202 at the end of its other arm. The cam follower may be held engaged with the surface of a cam 203 on shaft 58 by a spring 204. A rotation of the shaft 58 will cause the cam 203 to translate reciprocable motion to the slide member 192 and thus oscillate the rocker arm 161 to actuate the filament forming jaws 97 and 98.

The operation of feeding and forming the filament takes place at station D. No operations are performed at station E and at station F, G and H the stem 35 is positioned on the stem holder which is in its outer and lower position. As the conveyor moves, the stem holder, by reason of the cams 79 and 89, is raised and moved toward the positioned filament and grid, the grid being in its retracted position. The stem is so adjusted that the support wires 41 and 42 thereof move beneath the ends of the filament which project from the tongue and the head is then moved to station I for the operation of welding the filament to the supports.

Means for performing the welding operation may comprise a double set of welding members 205, 206, 207 and 208 (see Fig. 25). These jaws operate to weld the filament to the support while at station J pairs of jaws 211, 212 and 213, 214 serve to weld the grid to the support wires of the stem. As shown in Fig. 25 the jaws 208, 206, 212 and 214 are connected by conductor 215 with a binding post 216 and to which latter the return or negative line 232 of an electrical power source is connected.

The members 211 and 213 are connected to an upper binding post 217' of a make and break switch 224 on a grid welding timing mechanism 217 by conductor 221 and members 205 and 207 are connected to upper binding post 219' of a make and break switch 224' on a filament welding timing mechanism 219 by conductor 222. The lower binding posts of the switches 224 and 224' are connected to a binding post 231' by conductors 218 and 218' respectively and the binding post 231' is connected to a power supply line.

The timing mechanisms 217 and 219 may be of similar construction and may each include an insulated contact arm 223 normally urged upwardly to close the switch 224 by a spring 225. A cam 226 secured to shaft 55 engages an extension 227 on the arm 223 which arm rocks on pivot 228 and actuates the switch 224 which is in the current supply line represented by conductors 231 and 232. The timing mechanisms being of like construction the cams which operate them may be so formed and adjusted as to permit a passage of electrical energy through the filament welding members for the filament welding operation and through the grid welding members for welding the grid which separate operations are performed at station I and J in succession.

The mechanisms for actuating the filament and grid welding members are of similar construction and the mechanism for performing the filament welding operation is shown fully in Figs. 20 and 25, while part of the mechanism for actuating the grid welding members is shown in Fig. 25 the remaining portion of this latter mechanism is not shown since it is the same as that shown for actuating the filament welding members.

As illustrated in Figs. 20 to 23 the upper filament welding members 205, 207, and the lower welding members 206 and 208 are carried in clamps 233 and 233' respectively at the ends of extended brackets 234 and 235 secured to slidable heads 236 and 237 respectively. The said heads are slidable vertically in a guide-way 238 secured to the framework of the machine.

The upper and lower welding members must be moved vertically in opposite directions and the head 237 is therefore provided with a lifter rod 241 and the head 236 is provided with a pull rod 242. The free or exposed end of the rod 241 is attached to one end of a link 243 (see Fig. 25) the other end of the said link is pivotally attached to a rocker lever 244 pivoted at 245 on a stationary bracket 246.

The lever 244 is provided with cam follower 247 disposed in engagement with a cam 248 secured to shaft 55. The free or exposed end of the pull rod 242 is pivotally attached to one end of a link-rod 249 the opposite end of the rod being pivotally attached to a rocker lever 251 pivoted at 252 to the bracket 246.

The rocker lever 251 is provided with a cam follower 253 disposed in engagement with a cam 254 secured to the shaft 55. The cam 248 and 254 are so arranged that upon a rotation of the shaft 55 the lifter rod 241 and the pull rod 242 are moved in opposite directions to bring the filament welding members 207, 205 and 206, 208 together for the welding operation at which time the cams 226 of a timing device actuates to permit the passage of electrical energy through the welding members or electrodes.

Figure 20A:
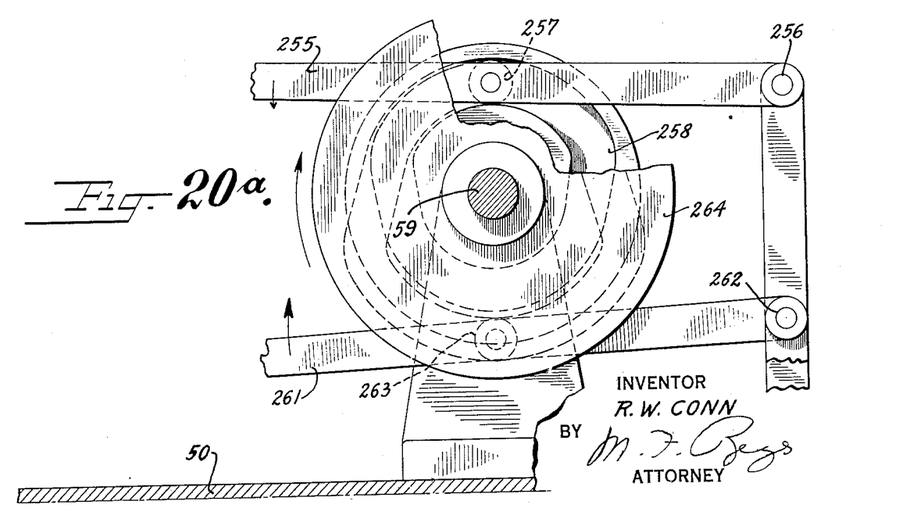
Fig 20a is a side elevational view of cam and lever mechanism for actuating grid welding mechanism.
Figure 21:
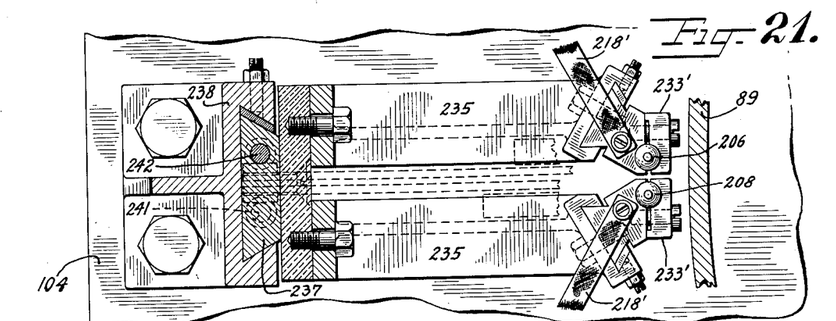
Fig. 21 is a plan view partly in section of lower welding arms and holders the section being taken on lines XXI—XXI in Fig. 20.

The grid welding members are also mounted on actuating rods. The upper welding members 213 and 211 being carried on pull-rod 254 pivotally attached to one end of a lever 255 pivoted at 256 (see Figs. 20a and 25). The lever 255 is provided with a cam follower 257 disposed in a grooved cam 258 secured to shaft 59. The lower grid welding members 212 and 214 being carried on a lifter rod 259 pivotally attached to a lever 261 pivoted at 262 and provided with a cam follower 263 disposed in a grooved cam 264 secured to shaft 59.

Figure 19:
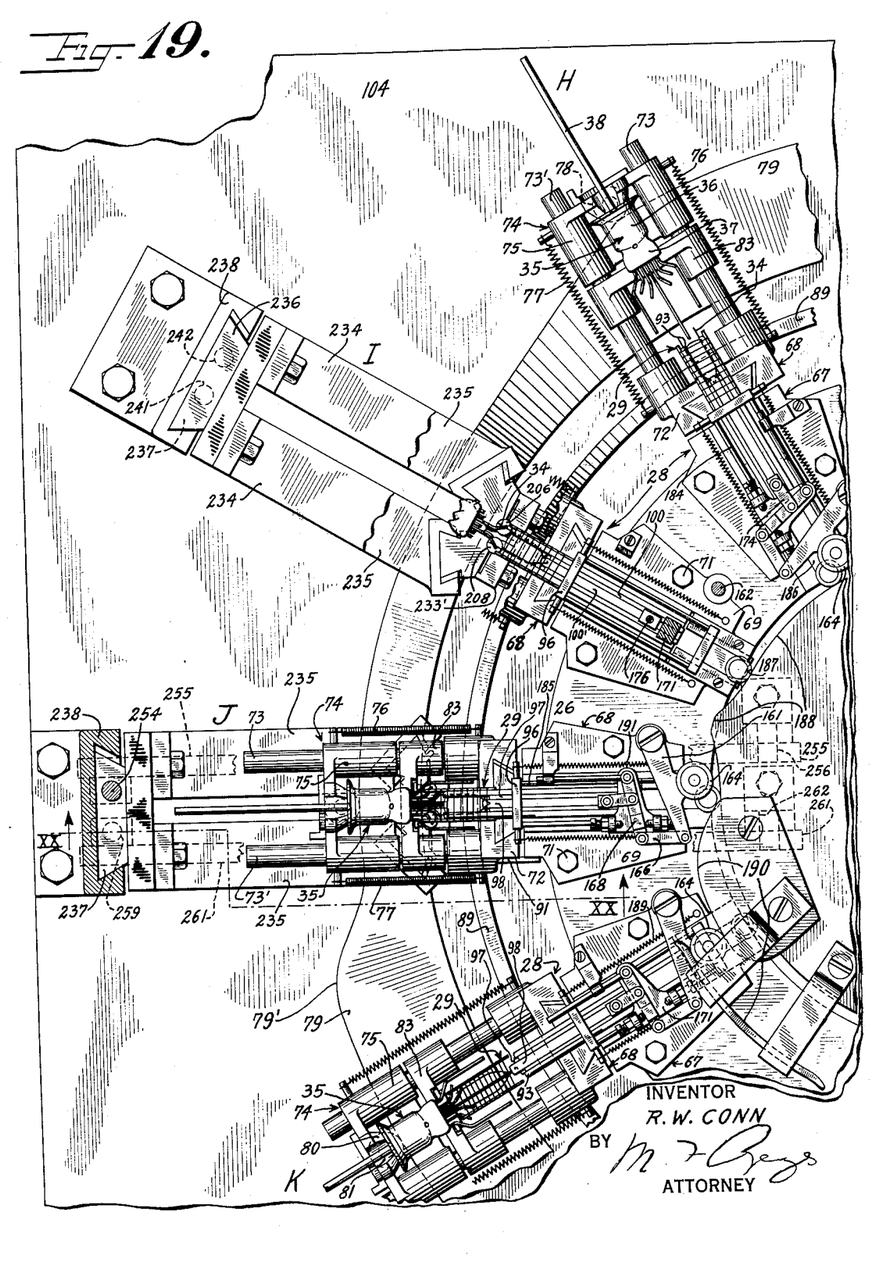
Fig. 19 is a fragmentary plan view of a conveyor and heads and shows the filament and grid welding devices as well as the finished product in released position and ready for unloading.

The cams 258 and 264 are so arranged and proportioned that a rotation of the shaft 59 will cause a movement of the grid welding members to weld the support wires of the grid to the support wires projecting from a stem. Before the head having the welded mount therein is moved to position K a lateral cam surface 79' (see Fig. 19) engages roller 78 on the cross piece 75 to move the carrier 74 to its outer position which action causes the grid to slip off the tongue 93, at the same time a cam 190 engages roller 164 on arm 161 which actuates the gripper members 100 and 100' and consequently the jaws 97 and 98 so that the gripper members move as the grid is slid off the tongue 93 and the jaws release the filament.

The conveyor may then move the stem with the mounted filament and grid to positions K and L at which positions the stem and mounted electrodes may be removed.

It will be evident that by reason of the present invention a machine is provided wherein stems for electrical devices such as radio tubes may be applied to a holder, the holder moved to position to receive a grid element and thence to position at which a filament wire is shaped to constitute a cathode. The stem is then positioned to bring support wires thereof in operative relation to the grid and cathode and welding means are operated to secure the said grid and cathode to the stem. The stem is then adjusted to position for removal.

It will be readily appreciated that by reason of the present invention the heretofore time consuming and tedious operation of forming and securing a filamentary cathode to a stem is performed automatically in a rapid and effective manner and that the operation of securing the grid to the stem which had heretofore required considerable amount of skill and time on the part of the operator it is now accomplished automatically to the end that the production of a radio tube mount may be produced at a relatively high rate of speed and at comparatively low cost.

Although a preferred embodiment of the invention is shown and described herein it will be understood that modifications may be made therein without departing from the spirit and scope of the invention as set forth in the appended claims.

What is claimed is:

1. A machine for mounting a filament wire to support members comprising means for supporting a grid, means for shaping a filament wire within said grid, means for moving support members adjacent to ends of said shaped filament, and means for securing said ends to said support members.

2. A machine for mounting a grid and filament on support members of a stem comprising means for supporting a grid, means for shaping a filament within said grid to provide two ends of the filament extending from one end of the grid, and means for securing said filament and grid to said support wires.

3. A machine for mounting a grid and filament wire on support members of a stem comprising means for supporting a grid, means for forming a given length of filament to V-shape within said grid, and means for securing the ends of said filament and grid to support members.

4. A machine for mounting a length of filament wire within a grid comprising means for supporting a grid and a stem having support members, means for positioning a given length of filament within said grid, means for forming said filament to V-shape and means for securing the ends of said filament to support members.

5. A machine for mounting a length of filament wire within a grid comprising means for supporting a grid and a stem having support members, means for shaping a given length of filament to V-shape within said grid, and means for securing said filament to said support members.

6. A machine for mounting a filament on a stem comprising means for supporting a grid, filament feeding means, means for moving said grid adjacent to said filament feeding means, means for severing a given length of filament, means for moving said length of filament into said grid, filament securing means, grid securing means, and means for progressively moving said filament and grid into operative relation with the respective securing means.

7. A machine for mounting a filament on a stem comprising means for supporting a grid, filament feeding means, means for moving said grid adjacent to said filament feeding means, means for severing a given length of filament, means for moving said length of filament into said grid, filament welding means, grid welding means, and means for moving said filament and grid into operative relation with the respective welding means.

8. A machine for mounting a filament and grid on support wires of a stem comprising a conveyor, a plurality of mounting heads on said conveyor, means on said heads to receive grids, a source of filament wire, means for severing a given length of wire from said source, means for moving said conveyor to position said heads successively in operative relation to said severed filament, means for moving said severed length of wire into said grid, means for securing said filament to support wires of said stem, and means for securing said grid to support wires of said stem.

9. A machine for mounting a filament and grid on support wires of a stem comprising filament wire feeding means, means for severing a given length of filament, means for shaping said severed length in a grid, filament welding means, grid welding means, a plurality of mounting heads, a conveyor for moving said heads progressively into operative relation with the several above mentioned means, and means for actuating said means for securing a grid and filament to support wires of said stem.

10. A head for mounting a filament and grid on support wires of a stem comprising a support for a filament, a grid support, a stem support, and means for changing the relative positions of said filament, grid and stem to position portions of said filament and grid adjacent to support wires of said stem for a welding operation.

11. A head for mounting a filament on support wires of a stem comprising a source of filament wire, means for severing a given length of said wire, means for shaping said severed filament, a stem support, and means for moving said stem support to position support wires thereof in given relation to portions of said filament for a welding operation.

12. A head for mounting a filament and grid on support wires of a stem comprising a source of filament wire supply, means for severing a given length of said filament wire, means for shaping said given length of filament wire, a stem support, means for moving said stem support to position support wires thereof adjacent to portions of said filament, and means for welding said filament and grid to said support wires.

ROBERT W. CONN.